(12) United States Patent
Lu et al.

(10) Patent No.: US 12,387,022 B2
(45) Date of Patent: Aug. 12, 2025

(54) APPARATUS AND METHOD OF OPTIMIZING AN INTEGRATED CIRCUIT DESIGN

(71) Applicant: Taiwan Semiconductor Manufacturing Company, Ltd., Hsinchu (TW)

(72) Inventors: Tsung-Che Lu, Tainan (TW); Chin-Ming Fu, Zhubei (TW); Chih-Hsien Chang, New Taipei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 440 days.

(21) Appl. No.: 17/858,744

(22) Filed: Jul. 6, 2022

(65) Prior Publication Data
US 2023/0281366 A1 Sep. 7, 2023

Related U.S. Application Data

(60) Provisional application No. 63/315,863, filed on Mar. 2, 2022.

(51) Int. Cl.
*G06F 30/327* (2020.01)
*G06F 30/20* (2020.01)
(Continued)

(52) U.S. Cl.
CPC ........ *G06F 30/327* (2020.01); *G06F 30/3308* (2020.01); *G06F 30/20* (2020.01); *G06F 30/323* (2020.01)

(58) Field of Classification Search
CPC .. G06F 30/327; G06F 30/3308; G06F 30/323; G06F 30/20
(Continued)

(56) References Cited

U.S. PATENT DOCUMENTS 5,297,066 A * 3/1994 Mayes .................. G06F 30/367
703/2
5,703,788 A * 12/1997 Shei ........................ G06F 11/22
716/102

(Continued)

FOREIGN PATENT DOCUMENTS

EP 533583 A1 * 3/1993 ......... G06F 17/5045
FR 2681748 A1 * 3/1993 ......... G06F 17/5045

(Continued)

OTHER PUBLICATIONS

Pecheux et al., VHDL-AMS and Verilog-AMS as Alternative Hardware Description Languages for Efficient Modeling of Multi-Discipline Systems, IEEE, Jun. 6, 2002, 23 pages. (Year: 2002).*
(Continued)

*Primary Examiner* — Phallaka Kik
(74) *Attorney, Agent, or Firm* — FOLEY & LARDNER LLP

(57) ABSTRACT

Method and apparatus for optimizing circuit design are disclosed. In one aspect, the method includes receiving a circuit design of an integrated circuit and identifying a first circuit design of a first subsystem of the IC and a second circuit design of a second subsystem of the IC. The first subsystem operates on a plurality of digital variable signals and the second subsystem operates on a plurality of analog variable signals. The method also includes synthesizing a first HDL netlist based on the first circuit design, synthesizing a second HDL netlist based on the second circuit design, and obtaining behaviors of the circuit design of the IC using a single HDL-based simulator with both the first HDL netlist and the second HDL netlist as inputs.

20 Claims, 13 Drawing Sheets

(51) Int. Cl.
*G06F 30/323* (2020.01)
*G06F 30/3308* (2020.01)

(58) Field of Classification Search
USPC .......... 716/103, 104, 106, 111, 136; 703/16
See application file for complete search history.

(56) References Cited

U.S. PATENT DOCUMENTS

| | | | | | |
|---|---|---|---|---|---|
| 5,867,399 | A * | 2/1999 | Rostoker | ............... | G06F 11/261 |
| | | | | | 714/E11.167 |
| 6,560,757 | B1 * | 5/2003 | Ballam | ................ | G06F 30/367 |
| | | | | | 703/2 |
| 6,785,642 | B1 * | 8/2004 | Ballam | ................ | G06F 30/367 |
| | | | | | 703/22 |
| 6,847,926 | B1 * | 1/2005 | Ballam | .................. | G06F 30/33 |
| | | | | | 716/136 |
| 6,912,494 | B1 * | 6/2005 | Ballam | ................ | G06F 30/367 |
| | | | | | 703/19 |
| 6,959,271 | B1 * | 10/2005 | Ballam | .................. | G06F 30/33 |
| | | | | | 716/136 |
| 8,601,412 | B1 * | 12/2013 | O'Riordan | ............. | G06F 30/38 |
| | | | | | 716/101 |
| 8,832,612 | B1 * | 9/2014 | O'Riordan | ............. | G06F 30/38 |
| | | | | | 716/101 |
| 8,903,698 | B2 * | 12/2014 | Walker | ................... | G06F 30/36 |
| | | | | | 703/14 |
| 9,135,384 | B1 * | 9/2015 | Santan | ................ | G06F 30/3308 |
| 9,703,921 | B1 * | 7/2017 | Lin | ........................ | G06F 30/33 |
| 10,095,821 | B1 * | 10/2018 | Lin | ........................ | G06F 30/33 |
| 10,769,336 | B1 * | 9/2020 | Zhang | ..................... | G06F 30/38 |
| 10,896,274 | B1 * | 1/2021 | Morency | ............ | G06F 30/3308 |
| 11,501,050 | B1 * | 11/2022 | Korchemny | ............ | G06F 30/38 |
| 11,734,482 | B1 * | 8/2023 | Bhattacharya | ...... | G06F 30/3308 |
| | | | | | 716/102 |
| 11,797,742 | B1 * | 10/2023 | Chakraborty | ........... | G06F 30/38 |
| 2002/0022950 | A1 * | 2/2002 | Ballam | ................... | G06F 30/33 |
| | | | | | 703/14 |
| 2002/0049576 | A1 * | 4/2002 | Meyer | ................... | G06F 30/367 |
| | | | | | 703/4 |
| 2005/0289490 | A1 * | 12/2005 | Shastri | ................. | G06F 30/367 |
| | | | | | 703/13 |
| 2006/0074626 | A1 * | 4/2006 | Biswas | ................. | G06F 30/367 |
| | | | | | 704/8 |
| 2007/0078638 | A1 * | 4/2007 | McDonald | .......... | G06F 30/3323 |
| | | | | | 703/14 |
| 2008/0301608 | A1 * | 12/2008 | McElvain | ............. | G06F 30/343 |
| | | | | | 716/125 |
| 2012/0198405 | A1 * | 8/2012 | Bhushan | ............... | G06F 30/367 |
| | | | | | 716/112 |
| 2013/0311152 | A1 * | 11/2013 | Walker | .................. | G06F 30/367 |
| | | | | | 703/4 |
| 2014/0325460 | A1 * | 10/2014 | Ferguson | ............. | G06F 30/367 |
| | | | | | 716/103 |
| 2015/0180503 | A1 * | 6/2015 | Schubert | ............... | G06F 30/367 |
| | | | | | 341/143 |
| 2017/0249416 | A1 * | 8/2017 | Sendig | .................. | G06F 30/398 |
| 2018/0129767 | A1 * | 5/2018 | Akkaraju | ................ | G06F 30/33 |
| 2020/0065114 | A1 * | 2/2020 | Garg | ..................... | G06F 9/5066 |
| 2021/0312113 | A1 * | 10/2021 | Bhattacharya | ...... | G06F 30/3323 |
| 2021/0374313 | A1 * | 12/2021 | Bhattacharya | ........ | G06F 30/327 |
| 2022/0121799 | A1 * | 4/2022 | Bhattacharya | ........ | G06F 30/367 |
| 2022/0327272 | A1 * | 10/2022 | Jyu | ........................ | G06F 30/38 |

FOREIGN PATENT DOCUMENTS

| | | | |
|---|---|---|---|
| JP | H04-074272 | A | 3/1992 |
| JP | 2000-181940 | A | 6/2000 |
| JP | 2008-163320 | A | 7/2008 |
| JP | 2010-092434 | A | 4/2010 |
| TW | 202018547 | A | 5/2020 |
| TW | I716115 | B | 1/2021 |
| TW | 202107330 | A | 2/2021 |
| TW | 202113653 | A | 4/2021 |
| WO | WO-0203310 | A1 * | 1/2002 ......... G06F 17/5036 |
| WO | WO-03046775 | A1 * | 6/2003 ......... G06F 17/5036 |
| WO | WO-2012/169000 | A1 | 12/2012 |

OTHER PUBLICATIONS

Al-Junaid, "SystemC-A: Analogue and Mixed-Signal Language for High Level System Design", University of Southampton, May 2006, 244 pages. (Year: 2006).*

PatentScope Machine English Transation of Japanese Patent Document No. JP199204272 (JP-H04-074272-A), machine tranlsated on Dec. 28, 2024. (Year: 2024).*

PatentScope Machine English Transation of Japanese Patent Document No. JP2010092434, machine tranlsated on Dec. 28, 2024. (Year: 2024).*

Office Action issued in connection with Taiwan Appl. No. 112100899 dated Jul. 28, 2023.

* cited by examiner

|  | Co-simulation | HDL |
|---|---|---|
| Simulation length (pts) | 256 | 4892 |
| Validation time (hrs) | 35 | 6 |
| Normalized speed (pts/hrs) | 7.3 | 815 (112x faster) |

FIG. 11

|  | Co-simulation | Analog-only | HDL |
|---|---|---|---|
| Simulation Time | Long | Very Long | Short |
| Simulator License Usage | High | Low | Low |
| High-Level Modeling | Yes | No | Yes |
| Need Gate-Level Netlist for Digital Sub-system? | No | Yes | No |
| System Scale | Medium | Small | Large |

APPARATUS AND METHOD OF OPTIMIZING AN INTEGRATED CIRCUIT DESIGN

CROSS-REFERENCE TO RELATED APPLICATION

This application claims priority to and the benefit of U.S. Provisional Application No. 63/315,863, filed Mar. 2, 2022, entitled "AN EFFICIENT SIMULATION METHOD FOR THE VERIFICATION OF MIXED-MODE SYSTEMS," which is incorporated herein by reference in its entirety for all purposes.

BACKGROUND

Designing an integrated circuit chip usually takes years for the chip to be produced and sold to the public. Today's chips often include a system-on-chip (SOC) that includes both analog and digital components that interact together which can be challenging to design. A critical part of the designing process is simulation the behavior of the chip using various kinds of simulators. The simulation can provide confirmation of the proof-of-concept for the design before the chip is fabricated in hardware.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 11 illustrates a table that shows a comparison of running co-simulation and HDL simulation of the example circuit of FIG. 10, in accordance with some embodiments.

FIG. 12 illustrates a table that compares the conventional methods of simulation and the disclosed technology, in accordance with some embodiments.

DETAILED DESCRIPTION

Figure 1:
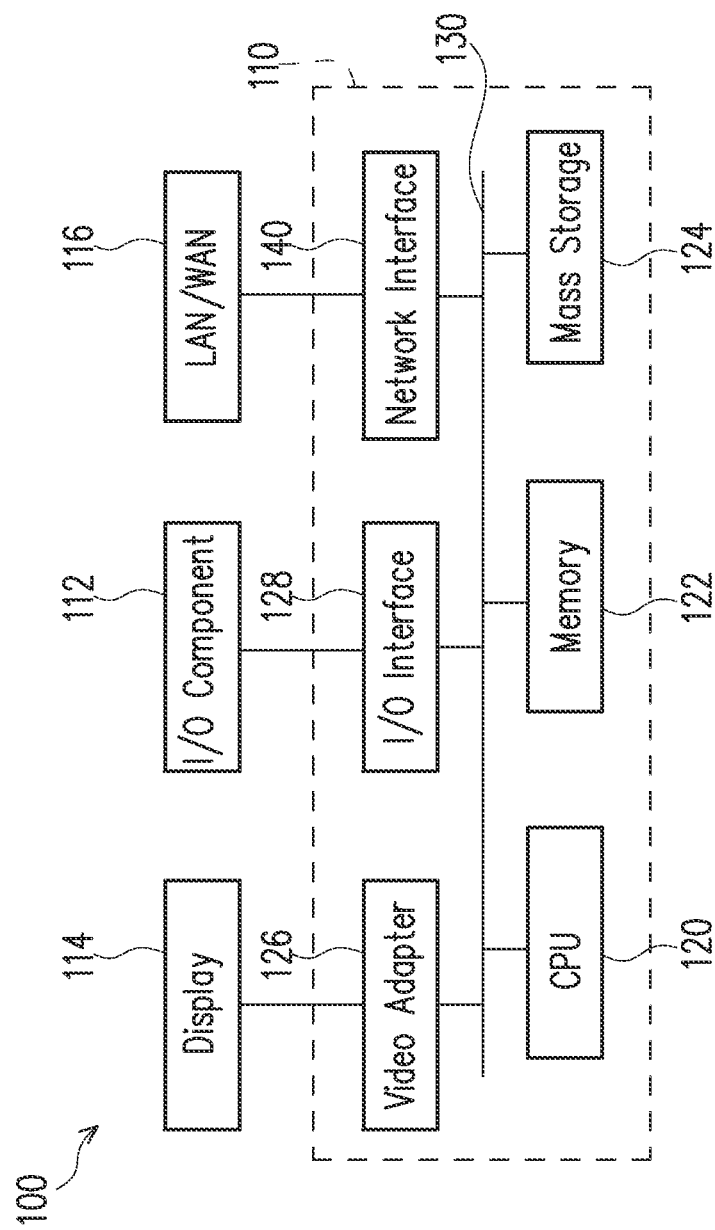
FIG. 1 illustrates a block diagram of an example information handling system (IHS), in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In general, demand for system-on-chip (SOC) has increased in recent years due to integrated circuit (IC) scaling and increase in processing capability. Such SOC systems usually include mixed-mode subsystem blocks which include both analog and digital subsystems that communicate with each other. To validate those mixed-mode blocks with simulation, conventional methods include co-simulation or analog simulation. Co-simulation includes system modeling and/or designing separate analog and digital design blocks, with the analog portions written at a transistor-level (e.g., simulation program with integrated circuit emphasis (SPICE) simulations) and the digital portions written in hardware description language (HDL) such as Verilog, VHDL, and/or SystemVerilog. This co-simulation method has several drawbacks such as low efficiency and high simulation times because the SPICE simulations often take very long, extra licenses are needed to run both SPICE and HDL simulations, and separate testbenches are set up to simulation both components. Using an analog simulator only includes writing both the analog and digital portions in transistor-level netlists. Although this analog simulation can result in high accuracy and reduce the need for extra licenses, the efficiency and simulation timing greatly suffers even more than the co-simulation methods. Furthermore, analog simulations require a gate-level HDL netlist for digital portions which require extra effort and design time, and high-level behavioral modeling cannot be performed.

Embodiments of the present disclosure include a novel simulation method and system for mixed-mode system simulation and/or validation with only HDL-level netlist and HDL-based simulators. Analog behavior modeling can be based on integral and differential-based equations for implementation in HDL level using numerical integration or Euler method in an iterative form. Embodiments provide advantages such as short simulation times for mixed-mode system validation and efficient license usage because only HDL-based simulators need to be used which reduce license costs. Other advantages include little testbench setup/preparation effort being required because only HDL-simulator setup is needed, and users are able to simulate high-level modeling in early stage development for fast proof-of-concept validation.

FIG. 1 illustrates a block diagram of an IHS 100, in accordance with some embodiments. The IHS 100 can be used to simulate a circuit design. The IHS 100 may be a computer platform used to implement any or all of the processes discussed herein to design an IC. The IHS 100 may comprise a processing unit 110, such as a desktop computer, a workstation, a laptop computer, or a dedicated unit customized for a particular application. The IHS 100 may be equipped with a display 114 and one or more input/output (I/O) components 112, such as a mouse, a keyboard, or printer. The processing unit 110 may include a central processing unit (CPU) 120, memory 122, a mass storage device 124, a video adapter 126, and an I/O interface 128 connected to a bus 130.

The bus 130 may be one or more of any type of several bus architectures including a memory bus or memory controller, a peripheral bus, or video bus. The CPU 120 may comprise any type of electronic data processor, and the memory 122 may comprise any type of system memory, such as static random access memory (SRAM), dynamic random access memory (DRAM), or read-only memory (ROM).

The mass storage device 124 may comprise any type of storage device configured to store data, programs, and other information and to make the data, programs, and other information accessible via the bus 130. The mass storage device 124 may comprise, for example, one or more of a hard disk drive, a magnetic disk drive, an optical disk drive, or the like.

The video adapter 126 and the I/O interface 128 provide interfaces to couple external input and output devices to the processing unit 110. As illustrated in FIG. 1, examples of input and output devices include the display 114 coupled to the video adapter 126 and the I/O components 112, such as a mouse, keyboard, printer, and the like, coupled to the I/O interface 128. Other devices may be coupled to the processing unit 110, and additional or fewer interface cards may be utilized. For example, a serial interface card (not shown) may be used to provide a serial interface for a printer. The processing unit 110 also may include a network interface 140 that may be a wired link to a local area network (LAN) or a wide area network (WAN) 116 and/or a wireless link.

It should be noted that the IHS 100 may include other components/devices. For example, the IHS 100 may include power supplies, cables, a motherboard, removable storage media, cases, and the like. These other components/devices, although not shown, are considered part of the IHS 100.

Figure 2:
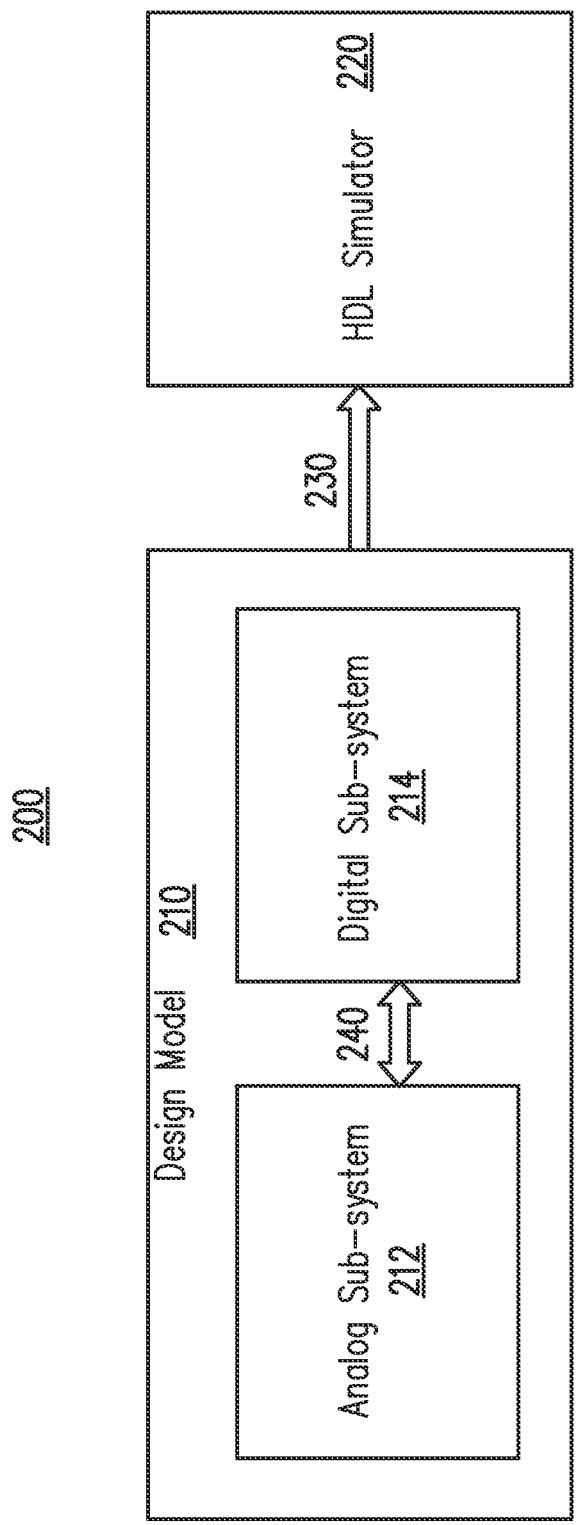
FIG. 2 illustrates an example block diagram of an architecture of simulating a mixed-mode system design, in accordance with some embodiments.

FIG. 2 illustrates an example block diagram of an architecture 200 of simulating a mixed-mode system design, in accordance with some embodiments. The architecture 200 includes a design model 210 and an HDL simulator 220. The design model 210 can include a circuit design that the user wishes to simulate. The design model 210 can include a mixed model that includes an analog subsystem 212 and a digital subsystem 214. Depending on the user's design, the analog sub-subsystem 212 and the digital subsystem 214 may communicate with each other using one or more connections 240.

In some embodiments, both the analog subsystem 212 and the digital subsystem 214 can be written in HDL. The analog subsystem 212 can include, for example, current mirrors, operational amplifiers (op-amp), voltage-controlled oscillators (VCO), resistor/inductor/capacitor (RLC) components, and more. The analog subsystems 212 can be modeled using mathematically using numerical integration and/or Euler methods as will be described further below. The digital subsystem 214 can include standard cells (e.g., a standard static random access memory (SRAM) cell, a dynamic random access memory (DRAM) cell) and logic cells (e.g., NOT gate, NAND gate, etc.). Although this disclosure describes various analog and digital subsystems, embodiments are not limited thereto and other analog and digital circuit elements can be included in the design model 210, depending on the user's design.

The design model 210 that is written in HDL can be transferred 230 to an HDL simulator 220 for simulation. The simulation may be performed using the IHS 100. For example, the HDL simulator 220 can receive as an input a user's IC design (e.g., design model 210) which includes the IC design written in HDL. The HDL simulator 220 can produce various output files and/or waveforms that the user can use to verify the functionality of the design model 210. Accordingly, a mixed-mode simulation of a design including both analog and digital components can be simulated efficiently and at a low cost, with great accuracy.

Figure 3:
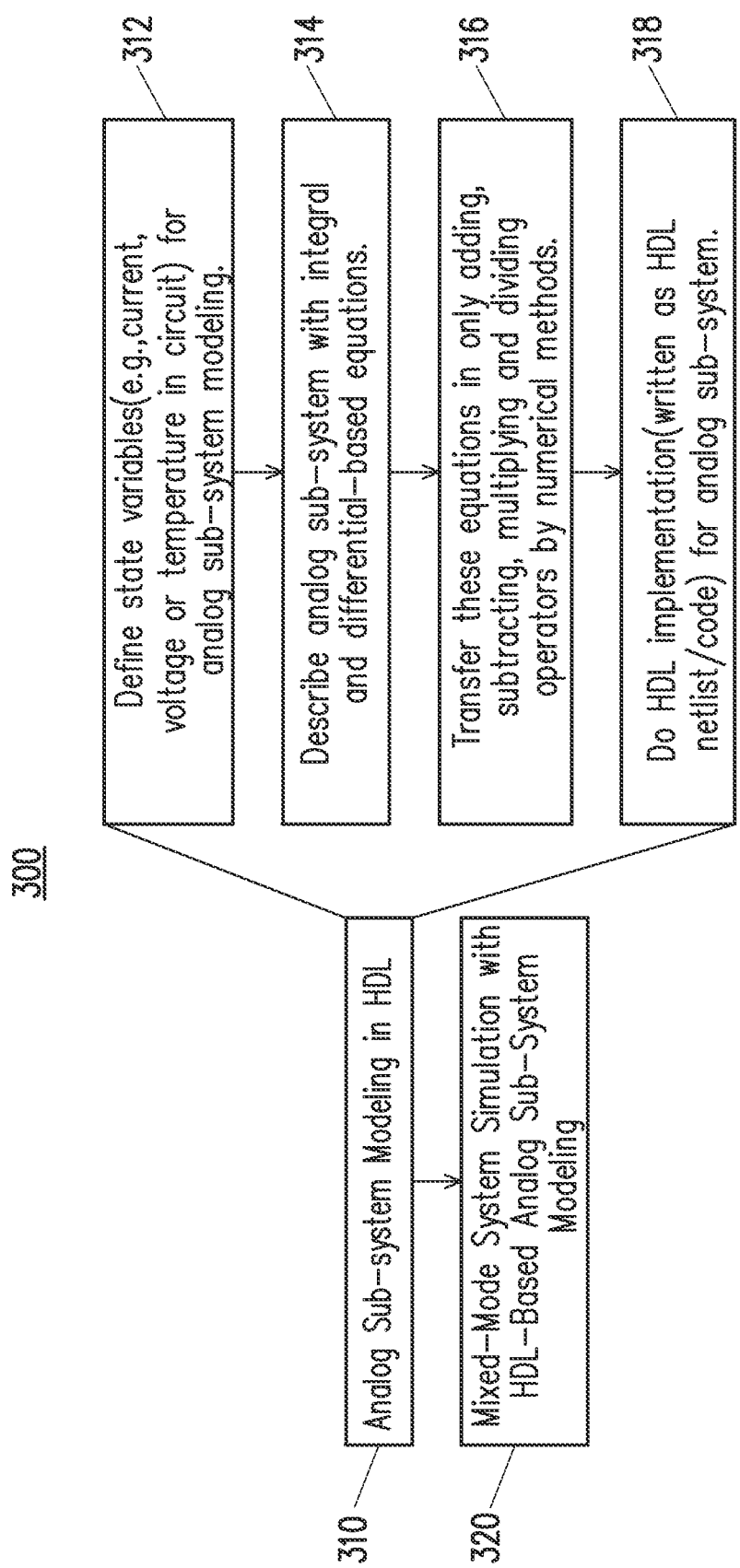
FIG. 3 illustrates a flowchart of an example method of optimizing a circuit design, in accordance with some embodiments.

FIG. 3 illustrates a flowchart of an example method 300 of optimizing a circuit design, in accordance with some embodiments. For example, the method 300 describes modeling the analog subsystem 212 in HDL and simulating the HDL-based design model 210 in the HDL simulator 220. The method 300 may be performed using the IHS 100 of FIG. 1, but embodiments are not limited thereto. In brief overview, the method 300 starts with operation 310 of modeling an analog subsystem in HDL and proceeds to operation 320 of simulating a mixed-mode system with HDL-based analog subsystem modeling.

Modeling an analog subsystem in HDL (operation 310) can include several more detailed operations. For example, operation 310 include operation 312 of defining state variables for analogy subsystem modeling. The state variables can include, for example, current, voltage, temperature of a circuit, etc. The operation 310 can also include operation 314 of describing analog subsystems in integral and differential-based equations. The operation 310 can further include operation 316 of transferring the integral and differential-based equations into equations that include only additions, subtractions, multiplication, and division operators by expanding the equations using numerical methods. Then the operation 310 can also include operation 318 of writing the expanded equations in HDL.

Figure 4:
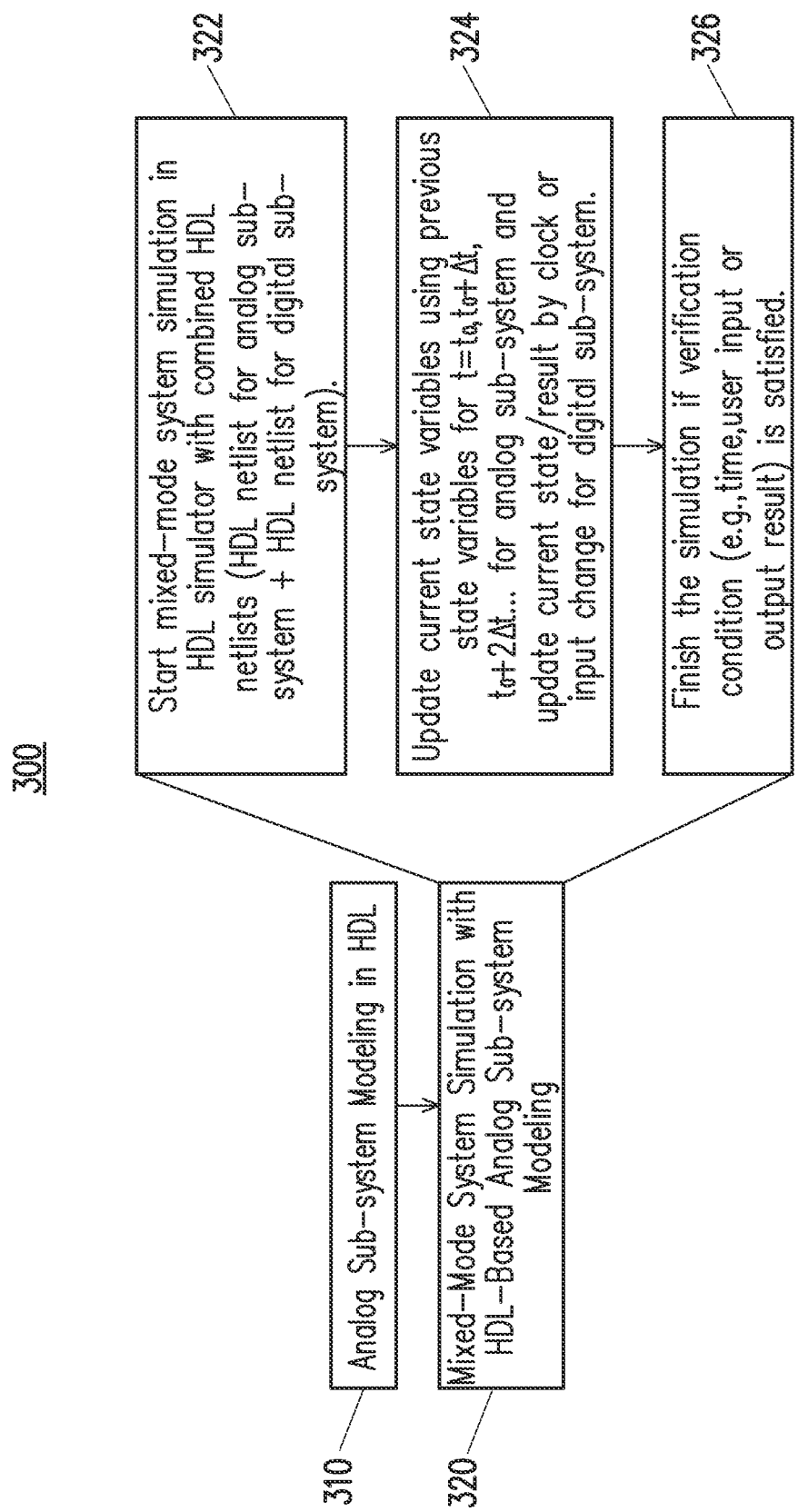
FIG. 4 illustrates the flowchart of FIG. 3 including additional operations of simulating the mixed-mode system, in accordance with some embodiments.

FIG. 4 illustrates the flowchart of FIG. 3 including additional operations of simulating the mixed-mode system of the operation 320, in accordance with some embodiments. For example, the operation 320 can include operation 322 of starting a mixed-mode simulation in the HDL simulator with a combined HDL netlist. The combined HDL netlist can include an HDL netlist for analog subsystem and an HDL netlist for digital subsystem. The operation 320 can include operation 324 of updating current state variables using previous state variables for t=$t_0$, $t_0$+Δt, $t_0$+2Δt . . . for analog subsystem and updating current state and/or result by clock or input change for digital subsystem. The operation 320 can include operation 326 of finishing the simulation if verification condition (e.g., simulation time, user input, output result, breakpoint, etc.) is satisfied. Accordingly, a mixed design including both analog and digital subsystems can be simulated using HDL so that the simulation is accurate, efficient, and cheaper.

Figure 6:
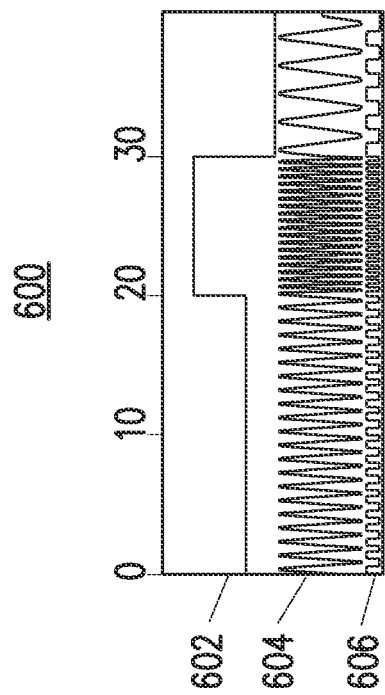
FIG. 6 illustrates a waveform of inputs and outputs of the analog circuit, in accordance with some embodiments.
Figure 5:
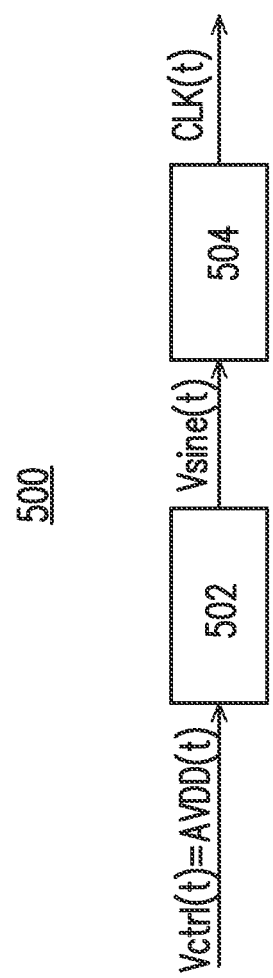
FIG. 5 illustrates an example block diagram of an analog circuit including a VCO, in accordance with some embodiments.

FIG. 5 illustrates an example block diagram of an analog circuit 500 including a VCO, in accordance with some embodiments. The analog circuit 500 is an example of an analog subsystem (e.g., analog subsystem 212) that can be transformed (or translated or rewritten or remodeled) in HDL during operation 302. FIG. 6 illustrates a waveform 600 of inputs and outputs of the analog circuit 500, in accordance with some embodiments. Although a VCO is described with respect to the analog circuit 500, embodiments are not limited thereto and the analog circuit 500 can include any analog circuit including a digital controller oscillator (DCO), etc.

The analog circuit 500 can include an input of a supply voltage AVDD as a function of time t. Sine wave generator 502 can receive the supply voltage AVDD(t) as an input and output an output voltage V sine(t) including an output voltage in the shape of a sine wave. The output voltage V sine(t) can be input to a square wave generator 504 that can output a clock signal CLK(t). The waveform 600 illustrates the supply voltage ADVV(t) 602, the output voltage V sine(t) 604, and the clock signal CLK(t) 606. As shown in the waveform 600, as the supply voltage ADVV(t) 602 increases, a frequency of the output voltage V sine(t) 604 increases, and then a frequency of the clock signal CLK(t) 606 also increases.

The equations used for generating the clock signal CLK(t) using the analog circuit may be as follows.

$$V_{out}(t) = \sin(\varphi_{lin}(t) + \varphi_{non-lin}(t)) \quad (1)$$

$$\varphi_{lin}(t) = 2\pi f_{center} t \quad (2)$$

$$\varphi_{non-lin}(t) = \left[2\pi K_{VCO}\int_0^t V_{ctrl}(t)dt\right] + \varphi_{non-lin}(0) \quad (3)$$

$$CLK(t) = \text{sign}(V_{out}(t)), \text{ where } \text{sign}(x) = \begin{cases} 1, \text{ if } x \geq 0 \\ 0, \text{ if } x < 0 \end{cases} \quad (4)$$

where $V_{out}(t)$ includes an oscillation waveform of the sine wave V sine(t), CLK(t) includes an oscillation waveform of the clock signal CLK(t), $\varphi_{lin}(t)$ includes a linear phase, $f_{center}$ includes the center frequency of the oscillation waveform, $\varphi_{non-lin}(t)$ includes a non-linear phase, $K_{VCO}$ includes a VCO (or DCO) gain (frequency/voltage), and $V_{ctrl}(t)$ (or AVDD (t)) includes a control voltage.

For Equation (3), the integral may be rewritten in numerical format as follows. As Δt→0, $$2\pi K_{VCO}\int_{t-\Delta t}^t V_{ctrl}(t)dt = 2\pi K_{VCO} V_{ctrl}(t)\Delta t \quad (5)$$

$$\varphi_{non-lin}(t) = \varphi_{non-lin}(t-\Delta t) + 2\pi K_{VCO} V_{ctrl}(t)\Delta t \quad (6)$$

Accordingly, the integral in Equations (3) can be rewritten to and/or approximated as a numerical format as shown in Equation (6). Then, all of the inputs and outputs of the analog circuit 500, as well as the functionality of the analog circuit 500 itself, can be written in equations without using integrals.

Once the analog circuit 500 is rewritten in a numerical format, the analog circuit 500 can be modeled in HDL. A pseudocode for the analog circuit 500 in HDL can be as follows:

```
module VCO (AVDD)
  every step at (t = t0, t0 + Δt, t0 + 2Δt ... ) {
    V_out ← sin (Φ_non-lin + Φ_lin);
    V_clk ← {1 if V_out > 0; 0 if V_out ≤ 0};
    Φ_non-lin ← Φ_non-lin + 2π*K_VCO*AVDD*Δt;
    Φ_lin ← 2π*f_center*t;
  } endmodule
```

The pseudocode can be a hardware representation (or approximation) of the analog circuit 500 including the VCO. The pseudocode above indicates that for every time step of Δt, a new value of $V_{out}$, $V_{clk}$, $\phi_{non-lin}$, and $\phi_{lin}$ can be written based on the values to the left of the arrow ←. For example, the $V_{out}$ can be written based on the equation $\sin(\phi_{non-lin} + \phi_{lin})$ and so on and so forth. Accordingly, the analog circuit 500 including the VCO can be modeled in hardware using HDL code.

Accordingly, the analog circuit 500 can be written in HDL code using equations and numerical expansions of the integrals. And once the HDL code is synthesized, the analog circuit 500 can be simulated using an HDL simulator (e.g., HDL simulator 220).

Figure 7:
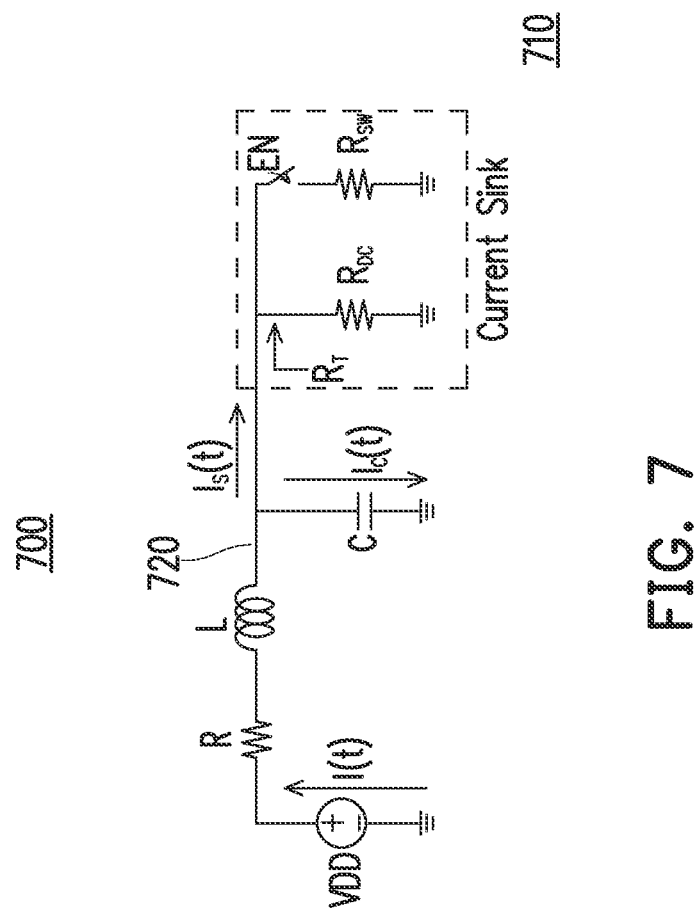
FIG. 7 illustrates an example block diagram of an analog circuit including an RLC circuit, in accordance with some embodiments.

FIG. 7 illustrates an example block diagram of an analog circuit 700 including an RLC circuit, in accordance with some embodiments. The analog circuit 700 is an example of an analog subsystem (e.g., analog subsystem 212) that can be transformed (or translated or rewritten or remodeled) in HDL during operation 302.

The analog circuit 700 includes a plurality of circuit elements including a voltage source VDD, resistor R, inductor L, capacitor C, and current sink 710. The current sink 710 includes a resistor $R_{DC}$, resistor $R_{SW}$, and enable switch EN. The current flowing through the voltage source VDD is I(t), the current flowing the capacitor C is $I_C(t)$, the current flowing from node 720 (e.g., node connecting the inductor L, the capacitor C, and the current sink 710) is $I_S(t)$, and an equivalent resistance of the current sink is $R_T$. The voltage at node 720 is AVDD(t) which is the supply voltage.

Using Kirchhoff's Voltage Law (KVL) and Kirchhoff's Current Law (KCL), the following current and voltage equations may be obtained for the analog circuit 700:

$$R_T = \begin{cases} R_{DC} & , \text{if } EN = 0 \\ (R_{DC}^{-1} + R_{SW}^{-1})^{-1} & , \text{if } EN = 1 \end{cases} \quad (7)$$

$$VDD = I(t)\cdot R + L\frac{dI(t)}{d(t)} + AVDD(t) \rightarrow \frac{dI(t)}{d(t)} = \frac{VDD - AVDD(t) - I(t)\cdot R_T}{L} \quad (8)$$

$$I_C(t) = C\frac{dAVDD(t)}{d(t)} \rightarrow \frac{dAVDD(t)}{d(t)} = \frac{I_C(t)}{C} \quad (9)$$

$$I_S(t) = AVD(t)/R_T \quad (10)$$

$$I_C(t) = I(t) - I_S(t) \quad (11)$$

where VDD is the fixed supply voltage.

Then, using Euler's method f(t)=f(t−Δt)+Δt·f'(t), the behavior of the analog circuit 700 can be modeled in equations:

$$I(t) = I(t - \Delta t) + \Delta t \cdot \frac{dI(t)}{d(t)} \quad (12)$$

$$AVDD(t) = AVDD(t - \Delta t) + \Delta t \cdot \frac{dAVDD(t)}{d(t)} \quad (13)$$

where AVDD(t–Δt) and I(t–Δt) can denote the voltage AVDD at node 720 and the current I(t) of voltage source VDD of a "previous" state and AVDD (t) and I(t) can denote the voltage AVDD and the current I of a "current" state. As shown above, the current I(t) and the voltage AVDD(t) can be rewritten using Euler's method.

Once the analog circuit 700 is rewritten in equations using Euler's method, the analog circuit 700 can be modeled in HDL. A pseudocode for the analog circuit 700 in HDL can be as follows:

```
module RLC (AVDD)
   every step at (t = t0, t0 + Δt, t0 + 2Δt ... ) {
      R_T ← [(R_DC)^-1 + EN*(R_SW)^-1]^-1;
      I_t=det_t ← I_previous,t=0 + Δt*(VDD-AVDD-I*R)/L;
      AVDD ← AVDD + Δt*(I_C/C);
      I_S ← AVDD/R_T;
      I_C ← I–I_S;
   } endmodule
```

The pseudocode can be a hardware representation (or approximation) of the analog circuit 700 including the RLC circuit. The pseudocode above indicates that for every time step of Δt, a new value of $R_T$, $I_{t=det\_t}$, AVDD, $I_S$, and $I_C$ can be written based on the values to the left of the arrow ←. For example, the $R_T$ can be written based on the equation $[(R_{DC})^{-1}+EN*(R_{SW})^{-1}]^{-1}$ and so on and so forth. Accordingly, the analog circuit 700 including the RLC circuit can be modeled in hardware using HDL code.

Accordingly, the analog circuit 700 can be written in HDL code using equations and Euler's method. And once the HDL code is synthesized, the analog circuit 700 can be simulated using an HDL simulator (e.g., HDL simulator 220).

Figure 8:
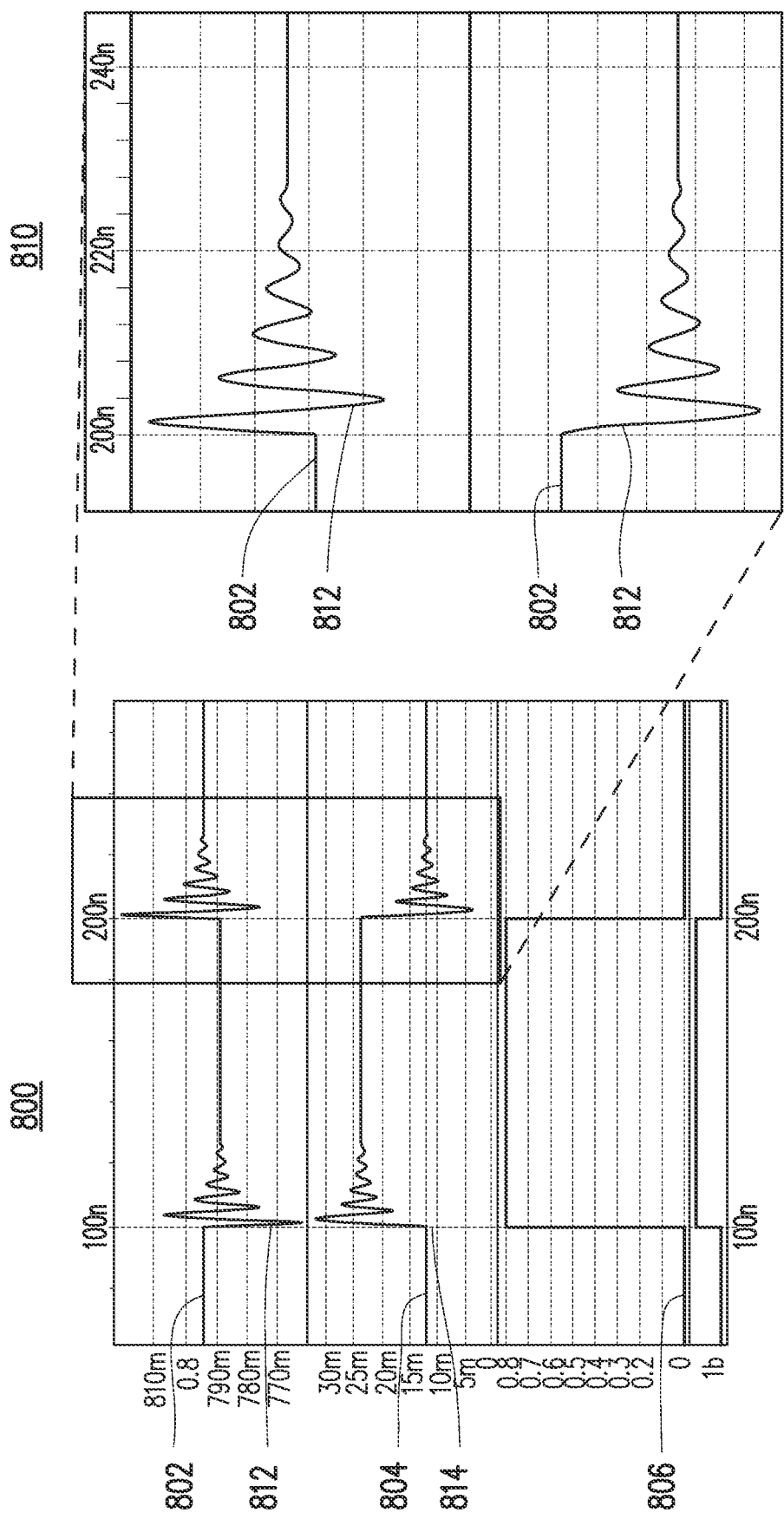
FIG. 8 illustrates example simulations of the various signals of the analog circuit of FIG. 7, in accordance with some embodiments.

FIG. 8 illustrates example simulations of the various signals of the analog circuit 700, in accordance with some embodiments. Example simulation 800 includes waveforms 802 and 804 which include simulations of the voltage AVDD(t) and I(t), respectively, using the HDL code. A simulation of the CLK signal is shown as waveform 806 as reference for when the clock edges occur.

Referring to analog circuit 700 of FIG. 7, simulation 800 includes waveform 802 that is a simulation of the voltage AVDD(t) using HDL code that has been written using the pseudocode for the analog circuit 700 above. Simulation 800 also includes waveform 812 which is a simulation of the voltage AVDD(t) using SPICE simulation. The waveforms 802 and 804 substantially overlap each other to show that the simulation using HDL code is almost as accurate as the simulation using SPICE. Similarly, simulation 800 includes waveform 804 that is a simulation of the current I(t) using the HDL code and the waveform 814 that is a simulation of the current I(t) using SPICE. The waveforms 804 and 814 substantially overlap each other because the simulation using HDL code (waveform 804) is very accurate and similar compared to the SPICE simulation (waveform 814). For reference, simulation 810 includes a portion of the waveform 800 that is zoomed-in.

Figure 9:
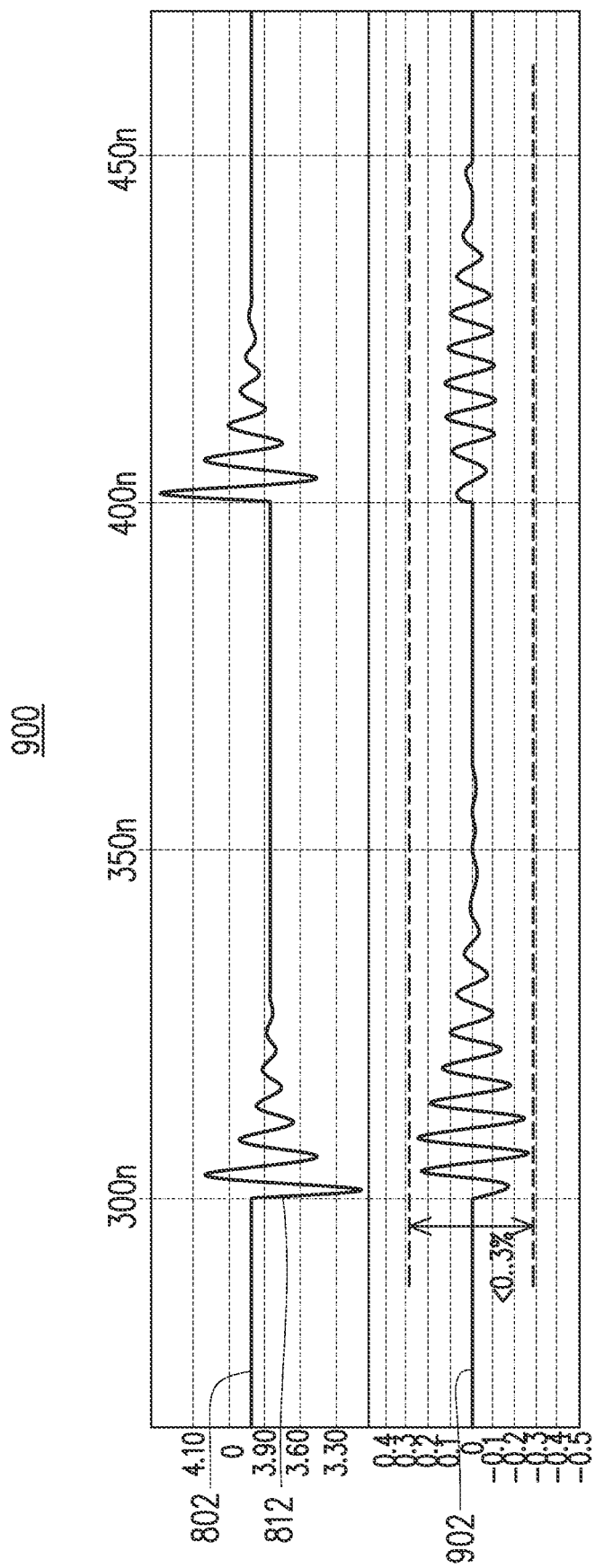
FIG. 9 illustrates waveforms that show the accuracy of the simulation of the HDL model, in accordance with some embodiments.

FIG. 9 illustrates waveforms that show the accuracy of the simulation of the HDL model, in accordance with some embodiments. A difference curve 902 shows that the difference between the waveform 802, generated using simulation of the analog circuit 700 based on HDL code, is very similar to the waveform 812, generated using simulation of the analog circuit 700 based on SPICE. In some embodiments, the accuracy of the waveform 802 is less than 0.3% different from the waveform 812 that was generated using the SPICE simulation. This accuracy is good enough to suit the needs of a designer who wants to simulate analog circuits in their design.

Figure 10:
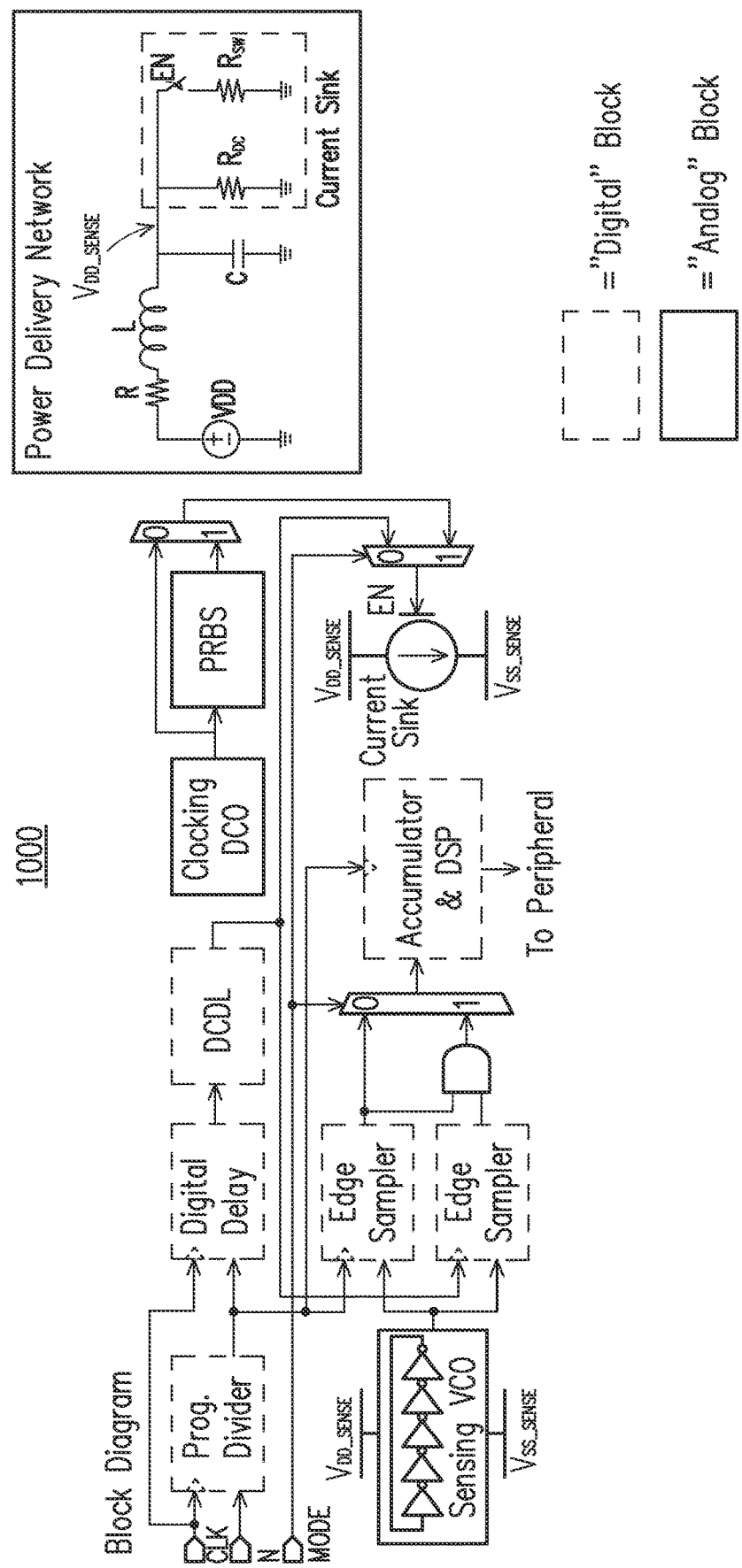
FIG. 10 illustrates a block diagram of an example circuit 1000 that includes a power impedance measurement (PIM) circuit, in accordance with some embodiments.

FIG. 10 illustrates a block diagram of an example circuit 1000 that includes a PIM circuit, in accordance with some embodiments. The example circuit 1000 includes several analog circuit blocks such as a sensing VCO, edge sampler, digital-controlled delay line (DCDL), clocking DCO, and current sink and power delivery network for the internal power domain $V_{DD\_SENSE}$. The example circuit 1000 also includes several digital circuit blocks such as program divider, digital delay circuit, pseudorandom binary sequence (PRBS) circuit, accumulator, digital signal processing (DSP) circuit, AND gates, and multiplexors. Additional analog and/or digital blocks may be included in the example circuit 1000.

FIG. 11 illustrates a table that shows a comparison of running co-simulation and HDL simulation of the example circuit 1000, in accordance with some embodiments. Conventional simulation systems and methods may simulate the analog circuit blocks (or analog subsystems) using SPICE simulation or other transistor-level simulation which can take a very long time and require lots of resources such as computing power and licenses. Even if using co-simulation where only the analog subsystems are simulated using SPICE, the simulation run times are still very slow. On the other hand, in some embodiments, if the analog subsystems are converted to digital format, the analog subsystems can be written in HDL so that the HDL simulator can simulate the analog subsystem like a digital subsystem.

As shown in FIG. 11, the simulation length of the co-simulation is 256 pts, whereas the HDL-based simulation is 4892 pts. The term "pts" is generally used as a unit to calculate the loading of a certain simulation. The validation time for the co-simulation time is 35 hours, whereas the HDL-based simulation only took 6 hours. A normalized speed, defined as simulation length over the validation time, is 7.3 pts/hrs for the co-simulation, whereas the HDL-based simulation has a normalized speed of 815 pts/hrs, which is 112 times faster than the co-simulation time. Although specific numbers are used, embodiments are not limited thereto, and the simulation length, validation time, and normalized speed may be less or higher, depending on the circuit design and a variety of other factors like the specific simulator, etc.

FIG. 12 illustrates a table that compares the conventional methods of simulation and the disclosed technology, in accordance with some embodiments. Several advantages of using HDL to model both analog and digital subsystem for simulation are shown.

First, simulation time for co-simulation is long because the analog subsystems have to be simulated in SPICE. The simulation time for analog-only simulations even longer because even the digital subsystems are simulated in SPICE. On the other hand, the simulation time for the HDL-based simulation is short.

Second, co-simulation requires the use of multiple simulator licenses because the analog subsystems may be simulated using a simulator that simulates with SPICE and the digital subsystems may be simulated using a similar that simulates with HDL. On the other hand, both the analog-only and the HDL-based simulations may require fewer simulator licenses.

Third, analog-only simulation is not conducive for high-level modeling for, e.g., proof concept because each gate and circuit has to be modeled the transistor level. On other hand, both the co-simulation and HDL-based simulations allow high-level modeling.

Fourth, the analog-only simulation requires a transistor level netlist for the digital subsystem, whereas the co-simulation and HDL-based simulation do not. This can reduce the amount of time and resources it takes to synthesize a design for simulation.

Fifth, the ability to scale a design and simulate the functionality of the design is important. The analog-only simulation method is not conducive for large scale designs because every transistor, resistor, capacitor, etc. has to have its terminals connected. A co-simulation method is only a little better because this method still requires the analog subsystems to have all of the connections precisely made. On the other hand, HDL-based simulations can allow large amounts of scaling for designs with both analog and digital subsystems because the gate-level connections are automatically made by the synthesizers.

Accordingly, HDL-based simulation is advantageous over co-simulation methods and analog-only simulation methods.

Figure 13:
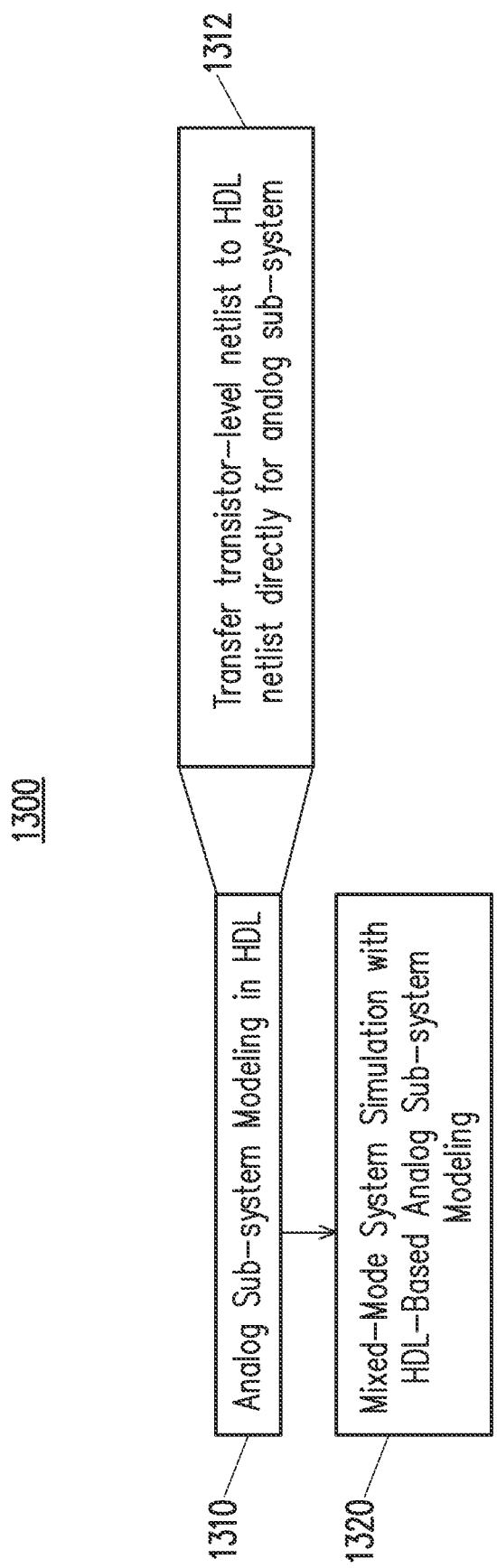
FIG. 13 illustrates a flowchart of another example method of optimizing a circuit design, in accordance with some embodiments.

FIG. 13 illustrates a flowchart of an example method 1300 of optimizing a circuit design, in accordance with some embodiments. In brief overview, the method 1300 starts with operation 1310 of modeling an analog subsystem in HDL and proceeds to operation 1320 of simulating a mixed-mode system with HDL-based analog subsystem modeling. The operation 1310 can include an operation 1312 of transferring or translating the transistor-level netlist into HDL netlist directly for the analog subsystem. The operation 1312 can be automatically performed if the analog subsystem is written in transistor-level netlists and stored in memory. The processor (e.g., HIS 100) can automatically receive the transistor-level netlists and translate them into HDL level netlists. Once the analog subsystem is converted to HDL netlists, the method 1300 can proceed to operation 1320. The operation 1320 can be similar to the operation 320 of FIG. 3, so similar descriptions are not repeated for clarity.

Figure 14:
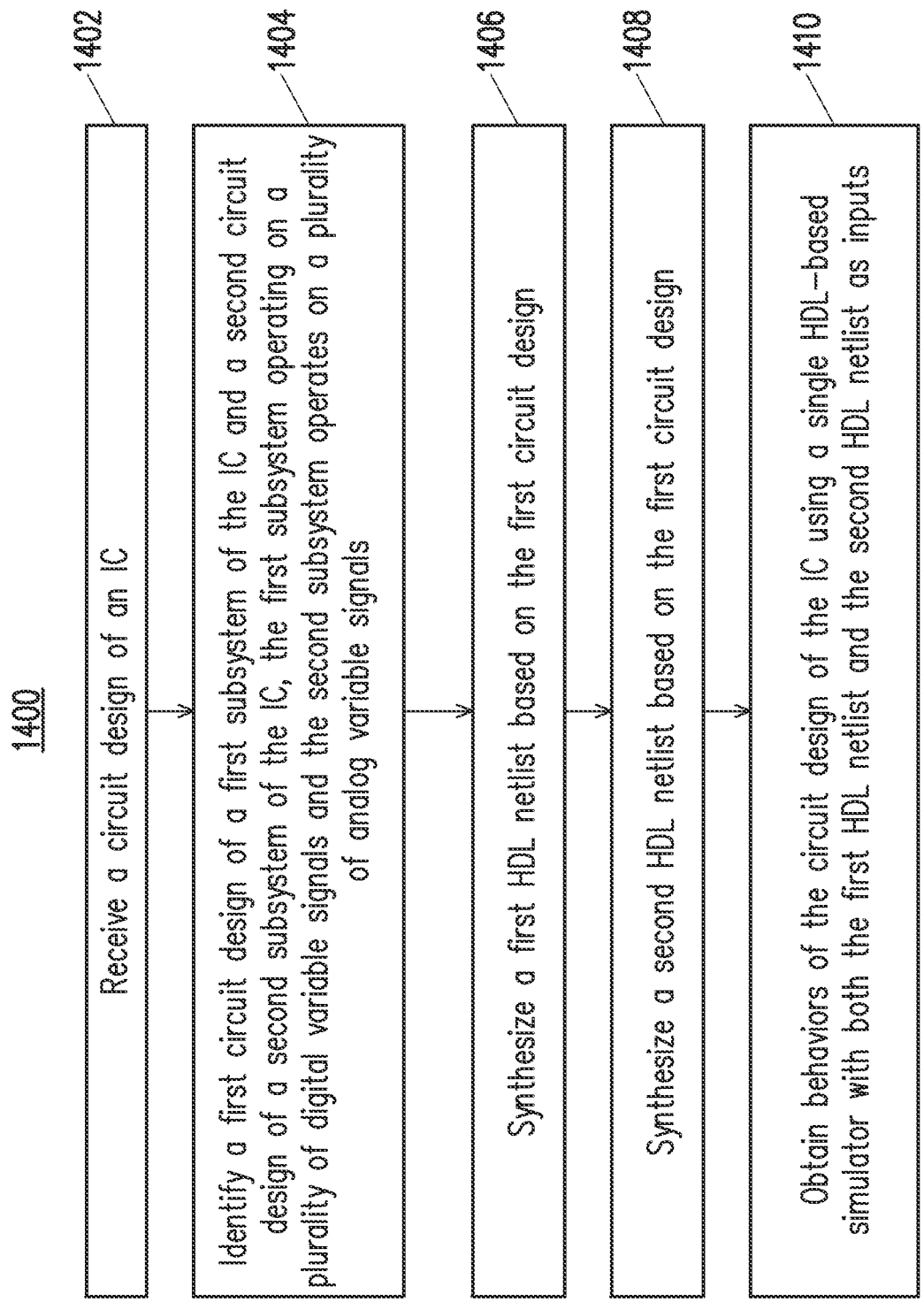
FIG. 14 illustrates a flowchart of a further example method of optimizing a circuit design, in accordance with some embodiments.

FIG. 14 illustrates a flowchart of an example method 1400 of optimizing a circuit design, in accordance with some embodiments. For example, the method 1400 describes modeling the analog subsystem 212 in HDL and simulating the HDL-based design model 210 in the HDL simulator 220. The method 1400 may be performed using the IHS 100 of FIG. 1, but embodiments are not limited thereto.

In brief overview, the method 1400 starts with operation 1402 of receiving a circuit design of an IC. The method 1400 proceeds to operation 1404 of identifying a first circuit design of a first subsystem of the IC and a second circuit design of a second subsystem of the IC. The first subsystem operates on a plurality of digital variable signals and the second subsystem operates on a plurality of analog variable signals. The method 1400 proceeds to operation 1406 of synthesizing a first HDL netlist based on the first circuit design. The method 1400 proceeds to operation 1408 of synthesizing a second HDL netlist based on the first circuit design. The method 1400 proceeds to operation 1410 of obtaining behaviors of the circuit design of the IC using a single HDL-based simulator with both the first HDL netlist and the second HDL netlist as inputs.

The operation 1402 includes receiving a circuit design of an IC (e.g., design model 210). The circuit design may be provided via the IHS 100 or other computing system.

The operation 1404 includes identifying a first portion as an analog subsystem (e.g., analog subsystem 212) and identifying a second portion as a digital subsystem (e.g., digital subsystem 214). The analog sub-system may include multiple analog components, and the digital subsystem may include multiple digital components, as shown in the example circuit 1000 of FIG. 10. The analog subsystem may originally be written in transistor-level netlists. In such a case, one or more processors may be used to generate HDL netlists. In some embodiments, the user may translate the behavior of the analog subsystem that include derivatives and integrals into numerical equations and/or Euler's method. The translation of the behavior into HDL may include approximations of the analog subsystem behavior.

The operation 1406 includes synthesizing a first HDL netlist based on the first circuit design. The first HDL netlist may include an HDL model of the analog subsystem.

The operation 1408 includes synthesizing a second HDL netlist based on the first circuit design. The second HDL netlist may include an HDL model of the digital subsystem.

The operation 1410 includes simulating the first and second HDL netlists using a single HDL-based simulator.

In one aspect of the present disclosure, a method for optimizing a circuit is disclosed. The method includes receiving a circuit design of an integrated circuit and identifying a first circuit design of a first subsystem of the IC and a second circuit design of a second subsystem of the IC. The first subsystem operates on a plurality of digital variable signals and the second subsystem operates on a plurality of analog variable signals. The method also includes synthesizing a first HDL netlist based on the first circuit design, synthesizing a second HDL netlist based on the second circuit design, and obtaining behaviors of the circuit design of the IC using a single HDL-based simulator with both the first HDL netlist and the second HDL netlist as inputs.

In another aspect of the present disclosure, a non-transitory computer-readable storage medium storing instructions for an IC design tool that, when executed by a computer, cause the computer to perform a method for optimizing an IC design is disclosed. The method includes receiving a circuit design of an integrated circuit and identifying a first circuit design of a first subsystem of the IC and a second circuit design of a second subsystem of the IC. The first subsystem operates on a plurality of digital variable signals and the second subsystem operates on a plurality of analog variable signals. The method also includes synthesizing a first HDL netlist based on the first circuit design, synthesizing a second HDL netlist based on the second circuit design, and obtaining behaviors of the circuit design of the IC using a single HDL-based simulator with both the first HDL netlist and the second HDL netlist as inputs.

In yet another aspect of the present disclosure, an apparatus for optimizing an IC design is disclosed. The apparatus includes one or more processors configured to receive a circuit design of the IC comprising a digital subsystem and an analog subsystem, synthesize a first HDL netlist for the digital subsystem, synthesize a second HDL netlist for the analog subsystem based on only adding, subtracting, multiplying, and dividing operators, and obtain behaviors of the circuit design of the IC using a single HDL-based simulator with both the first HDL netlist and the second HDL netlist as inputs.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for optimizing a circuit design, comprising:
receiving a circuit design of an integrated circuit (IC);
identifying a first circuit design of a first subsystem of the IC and a second circuit design of a second subsystem of the IC, wherein the first subsystem operates on a plurality of digital variable signals and the second subsystem operates on a plurality of analog variable signals;
synthesizing a first hardware description language (HDL) netlist based on the first circuit design;
synthesizing a second HDL netlist based on the second circuit design; and
obtaining behaviors of the circuit design of the IC using a single HDL-based simulator with both the first HDL netlist and the second HDL netlist as inputs.

2. The method of claim 1, wherein the step of synthesizing a second HDL netlist further comprises:
describing the second subsystem based on a plurality of equations, each of which is a function of one or more corresponding ones of the plurality of analog variable signals.

3. The method of claim 2, wherein the step of synthesizing a second HDL netlist further comprises:
identifying a first one of the plurality of equations including a differential equation; and
converting each of differential terms of the first equation into a corresponding numerical differentiation term.

4. The method of claim 2, wherein the step of synthesizing a second HDL netlist further comprises:
identifying a second one of the plurality of equations including an integral equation; and
converting each of integral terms of the second equation into a corresponding numerical integration term.

5. The method of claim 1, wherein the step of obtaining behaviors of the circuit design of the IC further comprises:
updating respectively current states of the plurality of analog variable signals by incrementing each of a plurality of time variables input to the second HDL netlist; and
updating respectively current states of the plurality of digital variable signals based on at least one of a clock signal or an input signal input to the first HDL netlist.

6. The method of claim 1, further comprising:
verifying the circuit design of the IC based on the obtained behaviors.

7. The method of claim 1, wherein the first subsystem comprises one or more logic cells.

8. The method of claim 1, wherein the second subsystem comprises at least one of: a current mirror, an amplifier, a voltage-controlled oscillator, or one or more resistor-inductor-capacitor (RLC) components.

9. The method of claim 1, wherein the IC includes a power impedance measurement system, in which the first subsystem includes a divider, a digital delay, a pseudorandom binary sequence circuit, an accumulator, and a digital signal processing circuit, and the second subsystem includes a voltage-controlled oscillator, a sampler, a digitally controlled delay line, a current sink, and a digitally controller oscillator.

10. A non-transitory computer-readable storage medium storing instructions for an integrated circuit (IC) design tool that, when executed by a computer, cause the computer to perform a method for optimizing an IC design, the method comprising:
identifying a plurality of first state variables to model an analog circuit;
constructing a plurality of integration/differentiation-based equations with the plurality of first state variables that govern operation of the analog circuit;
converting each of the plurality of integration/differentiation-based equations into a respective equation essentially consisting of adding, subtracting, multiplying, and dividing operators;
performing, based on the converted equations, a first hardware description language (HDL)-based simulation to obtain behaviors of the analog circuit.

11. The non-transitory computer-readable storage medium of claim 10, the method further comprising:
identifying a plurality of second state variables to model a digital circuit;
performing a second HDL-based simulation to obtain behaviors of the digital circuit.

12. The non-transitory computer-readable storage medium of claim 11, wherein the step of performing a first HDL-based simulation and the step of performing a second HDL-based simulation are concurrently performed by a single simulator.

13. The non-transitory computer-readable storage medium of claim 10, wherein the step of performing a first HDL-based simulation comprises updating the plurality of first state variables by incrementing each of a plurality of time variables input to the converted equations.

14. The non-transitory computer-readable storage medium of claim 10, the method further comprising constructing an HDL netlist for the analog circuit based on the converted equations, wherein the HDL netlist is used as an input for the first HDL-based simulation.

15. The non-transitory computer-readable storage medium of claim 10, wherein the analog circuit comprises at least one of: a current mirror, an amplifier, a voltage-controlled oscillator, or one or more resistor-inductor-capacitor (RLC) components.

16. An apparatus for optimizing an integrated circuit (IC) design, comprising one or more processors, the one or more processors configured to:
receive a circuit design of the IC comprising a digital subsystem and an analog subsystem;
synthesize a first hardware description language (HDL) netlist for the digital subsystem;
synthesize a second HDL netlist for the analog subsystem based on only adding, subtracting, multiplying, and dividing operators; and
obtain behaviors of the circuit design of the IC using a single HDL-based simulator with both the first HDL netlist and the second HDL netlist as inputs.

17. The apparatus of claim 16, wherein the one or more processors are further configured to:
- describe the analog subsystem based on a plurality of equations, each of which is a function of one or more corresponding ones of a plurality of analog variable signals;
- identify a first one of the plurality of equations including a differential equation; and
- convert each of differential terms of the first equation into a corresponding numerical differentiation term.

18. The apparatus of claim 16, wherein the one or more processors are further configured to:
- describe the analog subsystem based on a plurality of equations, each of which is a function of one or more corresponding ones of a plurality of analog variable signals;
- identify a second one of the plurality of equations including an integral equation; and
- convert each of integral terms of the second equation into a corresponding numerical integration term.

19. The apparatus of claim 16, wherein the digital subsystem comprises one or more logic cells.

20. The apparatus of claim 16, wherein the analog subsystem comprises at least one of: a current mirror, an amplifier, a voltage-controlled oscillator, or one or more resistor-inductor-capacitor (RLC) components.

\* \* \* \* \*